No. 685,792. Patented Nov. 5, 1901.
H. PEMBERTON, Jr.
PROCESS OF DEHYDRATING GLAUBER SALT.
(Application filed Jan. 30, 1901.)
(No Model.) 2 Sheets—Sheet 1.
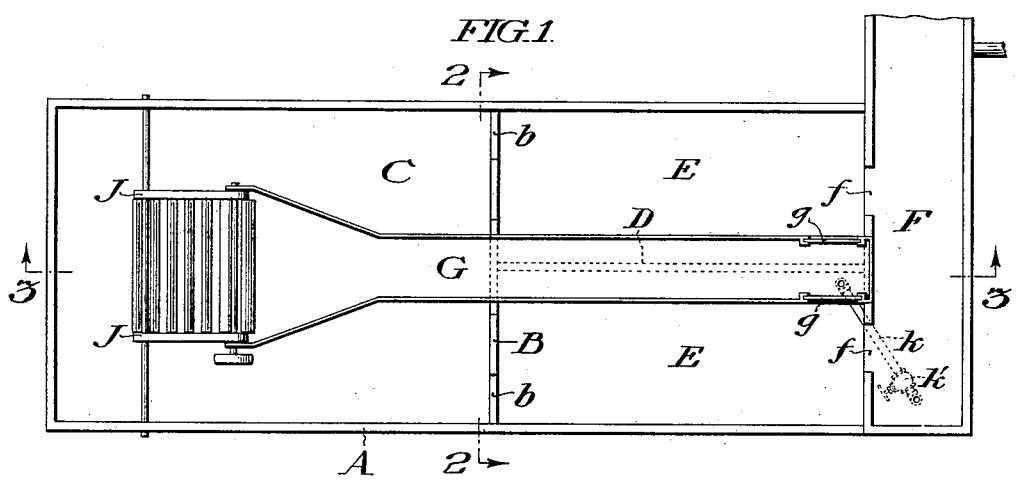
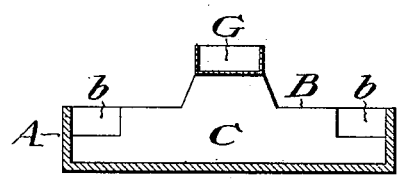
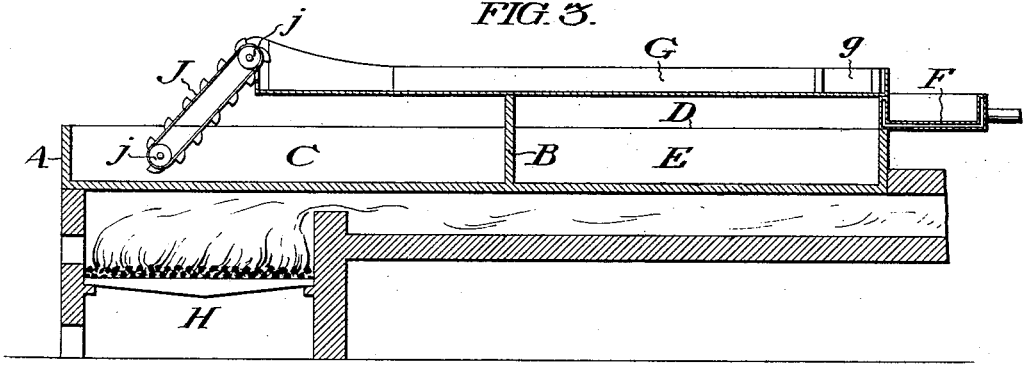
WITNESSES: INVENTOR:

No. 685,792. Patented Nov. 5, 1901.
H. PEMBERTON, Jr.
PROCESS OF DEHYDRATING GLAUBER SALT.
(Application filed Jan. 30, 1901.)
(No Model.) 2 Sheets—Sheet 2.
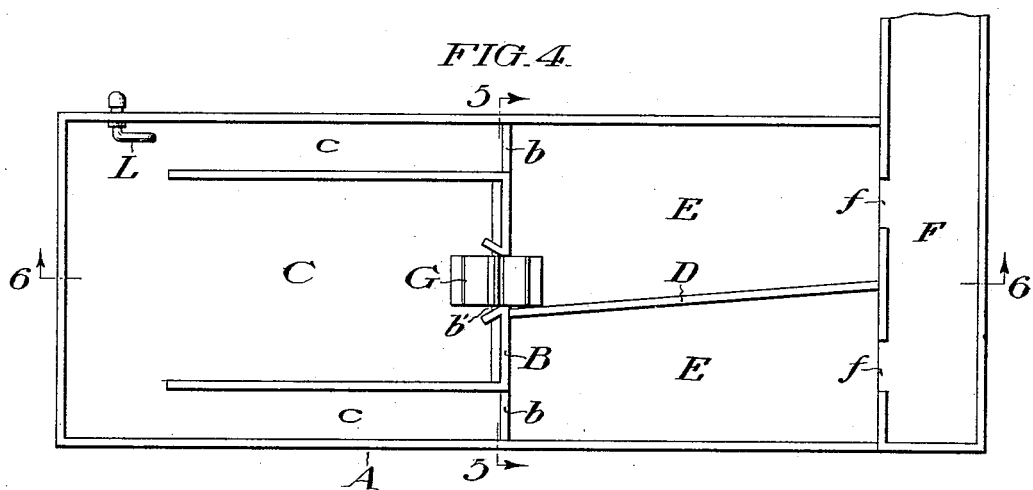
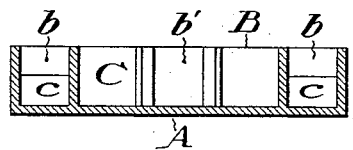
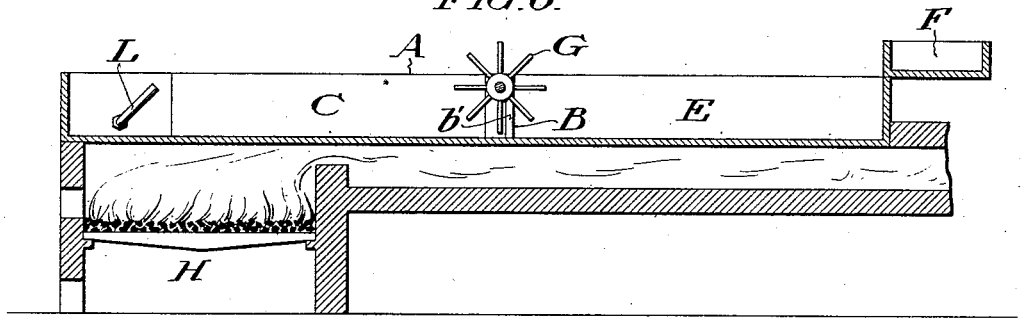
WITNESSES: INVENTOR:

UNITED STATES PATENT OFFICE.

HENRY PEMBERTON, JR., OF PHILADELPHIA, PENNSYLVANIA.

PROCESS OF DEHYDRATING GLAUBER SALT.

SPECIFICATION forming part of Letters Patent No. 685,792, dated November 5, 1901.

Application filed January 30, 1901. Serial No. 45,283. (No specimens.)

*To all whom it may concern:*

Be it known that I, HENRY PEMBERTON, Jr., a citizen of the United States, residing at No. 1008 Clinton street, in the city and county of Philadelphia and State of Pennsylvania, have invented certain new and useful Improvements in Processes of Dehydrating Crystallized Sodium Sulfate, whereof the following is a specification, reference being had to the accompanying drawings.

Crystallized sodium sulfate, commonly called "Glauber salt," when pure contains about fifty-six per cent. water. The salt occurs naturally in large quantities in what are called "soda-lakes", where, however, the native crystals contain an increased percentage of water due to mechanical absorption, so that in this state the crystallized salt frequently contains about sixty per cent. of water. The old way of obtaining anhydrous salt from these native crystals was to heat them until they dissolved in their water of crystallization and then evaporate the water by boiling and follow by calcination in a reverberatory furnace. This process consumed a large amount of fuel and time, was constantly interfered with by the tendency during the boiling process of the anhydrous precipitate to cake against the bottom and sides of the vessel, so that it became cracked or burned out, and necessarily resulted in an impure product by reason of the fact that the native crystals are rarely, if ever, perfectly pure, and the process afforded no opportunity for the removal of the impurities.

By Letters Patent of the United States No. 392,286, granted to me November 6, 1888, I patented and described an improved process which consists, essentially, in running a hot saturated solution of sulfate of soda into a vessel containing the crystals until they melt and then allowing the anhydrous salt, or rather such proportion of it as will separate under these conditions, to precipitate and afterward running off the remaining solution or mother-liquor and drying the precipitate. This I found to be a great improvement upon the old processes.

My present process consists in an improvement upon that which I previously patented in that I maintain a continuous circulation of the hot solution, whereby I am able to carry on the precipitating process at a higher temperature, (although still below the boiling-point,) and thereby obtain an increased yield, owing to the fact that the solubility of the anhydrous sulfate decreases as the temperature rises. I also obtain by my improved process a considerable saving of fuel and labor and other accompanying advantages which I will mention as the steps of the process are described.

In practicing my present process I maintain in proximity to each other two vessels or compartments, one of which contains saturated solution of sodium sulfate or mother-liquor, in which compartment but little precipitation occurs. This compartment I maintain at or near the boiling-point of the solution. The other vessel or compartment is constantly receiving the crystalline salt and is maintained at a temperature less than the boiling-point and yet as near that limit as is practicable by continuously circulating the hot mother-liquor between the two vessels, so that it can perform its function of effecting the precipitation of the anhydrous salt from the melted crystals in the one vessel at a temperature near to but below the boiling-point, while in the other the consequent loss of heat is regained.

I further provide in my present process for the successive use of two or more of those compartments which contain the crystallized salt, so that while precipitation is going on in one the removal of the precipitate can be effected in another. I also employ the excess of hot mother-liquor for the purpose of preheating the crystals which are about to be treated.

In the accompanying drawings I have illustrated two simple forms of apparatus in which to carry on my improved process, it being understood, however, that my process is not dependent upon the particular form of apparatus described and that the process may be carried on in any suitable apparatus. I may here remark, however, that it is essential that any apparatus for the practice of this process, as well as the condition of the process, should be such as to require a minimum expenditure for fuel and labor, because of the fact that the finished product (salt cake) has a commercial value so low that it will not permit of much expense in handling or of much fuel, as is necessary in any process which relies upon evaporation merely.

In the accompanying drawings, Figure 1 is a plan view of a suitable apparatus such as I have referred to. Fig. 2 is a vertical cross-section of the same along the line 2 2, Fig. 1. Fig. 3 is a vertical longitudinal section of the same along the line 3 3, Fig. 1. Fig. 4 is a plan view of an alternative form of apparatus. Fig. 5 is a vertical cross-section of Fig. 4 along the line 5 5, and Fig. 6 is a vertical longitudinal section or Fig. 4 along the line 6 6.

In both the forms of apparatus which I have described the treatment is effected in a metal vessel the depth of which is comparatively small as related to its other dimensions. I have shown a direct fire for the purpose of applying the heat; but it will be understood that other means for applying heat may be substituted therefor.

Referring to Fig. 1, it will be observed that the apparatus consists of a large flat rectangular metal vessel or pan A, divided about the middle into two compartments by a partition B. Of the two compartments thus produced the one to the left (lettered C) is the one where the continual heating of the mother-liquor occurs. To the right of partition B the vessel is again subdivided by a longitudinal partition D into two compartments E E, both of which are used for the precipitation step of the process. Along the right-hand end of the vessel is a shallow trough F, communicating with the compartments E E by suitable openings $f$ $f$. Partition B has partial openings $b b$, (see Fig. 2,) cut to about half its depth at each corner, but otherwise is of the full depth of the vessel. Its central portion forms a support for a longitudinal trough G, which starts over the center of compartment C and runs coincidently with the median line of the vessel to its extreme right-hand end, where it is furnished with two gates $g$ $g$, opening one over each of the compartments E. Beneath the forward end of compartment C is a grate or other fireplace H, the products of combustion being led through a flue running beneath the entire vessel. An endless chain J with buckets is mounted on two sprocket-wheels $j j$ near the forward end of compartment C and in diagonal relation thereto, so that the rotation of the chain continuously lifts liquid from that compartment and delivers it into that end of the trough G. The means for effecting rotation of the endless chain are not shown, but may most conveniently be applied to the shaft carrying the upper sprocket-wheel. The trough F is formed with hollow walls and bottom, and the interior of the jacket thus formed is placed in communication by a pipe $k$ with the bottom of the trough G, the opening of the pipe to the trough being controlled by a suitable cock $k'$, the use of which pipe will be hereinafter explained.

To start the process, the entire vessel A is filled with mother-liquor—that is to say, a solution of sodium sulfate, which has been heated and has thrown down all of the anhydrous sulfate which it will part with. For this purpose a quantity of the crystallized salt is introduced and by the application of a gentle heat the crystals are melted in their water of crystallization. During this process the compartment C is well stirred and raked in order to prevent caking and scaling, which would otherwise occur owing to the dense and adhering character of the anhydrous sulfate which is immediately deposited as a heavy precipitate. When all of the crystals have disappeared as such, all of the precipitated salt in compartment C is removed from the pan by a rake or similar implement. It will be understood that this is a preliminary operation only and that thereafter there is no substantial quantity of precipitate in the compartment C. The vessel being thus filled with mother-liquor, the heat from the fire may be increased until the temperature in compartment C is raised to or nearly to the boiling-point, which can now be done without injury to the vessel or without the necessity of stirring or raking. The crystals are fed to the apparatus from any convenient source along the trough F and are admitted in convenient quantities through one of the openings $f$ into one of the compartments E, which are not so hot as compartment C by reason of their not being exposed to the direct heat of the fire. The crystals which have been introduced soon melt in the mother-liquor and throw down a definite proportion of their contained sulfate of soda in the form of a precipitate which is variously termed by different authorities the "anhydrous" or the "monohydrate" sulfate of soda. I shall use the first of these terms. As has been stated, it is important for this step of the process that there should be no actual boiling of the contents of compartment E, as the thumping and splashing which results from ebullition interferes seriously with the process and caking at the bottom destroys the apparatus. On the other hand, it is important that the temperature should be maintained as high as practicable, provided it is below the boiling-point, because of the fact that the insolubility of the anhydrous salt increases as the temperature rises, so that the higher the temperature the greater the yield of precipitate. It is not practical to thus regulate the temperature by the direct application of heat, for a fire below the compartment causes caking, and to lead the hot products of combustion over the vessel by a reverbatory construction contaminates the material. To bring about the proper medium condition between these two extremes is the object of my process, and I attain this condition by maintaining continuous circulation of the hot mother-liquor. For this purpose the endless bucket-chain J is set in motion and the hot or boiling liquor delivered to trough G and thence fed continuously into compartment E by the corresponding gate $g$. Here it acts upon the crystals, and, mingled with the new mother-liquor produced from the crystals, flows back into compartment C through the opening $b$, where, however, the unbroken lower half of the partition prevents the precipitate from escaping. There is a constant tendency toward a low temperature in compartment E, due to three causes—first, it is impossible, for the reasons explained, to maintain a high temperature by direct heat at the bottom of the vessel; second, the temperature is constantly lowered by the introduction of new supplies of comparatively cold crystals, and, third, the solution or melting of the crystals in the mother-liquor is an endothermic action constantly absorbing heat. To overcome these cooling tendencies, the steady and oftentimes rapid circulation of the liquor from the heated compartment C is necessary.

Within compartment E there are three more or less distinct layers—first, the mother-liquor on top, mingled with that additional quantity which has been yielded by the crystals introduced, which as it cools is constantly flowing back into compartment C to be reheated; below this a slushy mixture of melting crystals, and at the bottom a dense deposit of the separated anhydrous salt, which has a specific gravity approaching that of sand and lies as a heavy mass resembling mortar or schmierkase at the bottom. It is obvious that as additional crystals are added and melted the total quantity of mother-liquor will be always increasing. In order to prevent this excess from overflowing the edge of the vessel, an outlet is provided in the shape of a pipe $k$, through which as rapidly as is necessary some of the liquor is run off through the jacket or trough F, where it serves the purpose of keeping the trough hot enough to somewhat raise the temperature of the otherwise cold supply of crystals ready to be introduced into compartment E. After thus yielding its heat the liquor may run off into any convenient place (or back into the soda-lake, if convenient) to cool or to evaporate, and thereby form new crystals. As soon as the precipitate in one of the compartments E is formed to the extent of reaching to the height of the bottom of the opening $b$ the use of that compartment is temporarily stopped by closing the gate $g$, leading from trough G to that compartment, and opening instead that leading to the other compartment E, where a like process of introduction and melting of the crystals, with precipitation, is carried on, during which time the precipitate in the first-used compartment is removed by raking it out onto drainers, where it may afterward be heated in the calcining-furnace, as described in my previous patent. If desired, mechanical means may be resorted to for raking the precipitate into side pockets, from which it can be removed by an elevator. It will thus be seen that by the alternate use of compartments E E the process as far as the heating of the mother-liquor is concerned may be maintained without interruption, and consequently without any waste of heat, a constant stream always being pumped out of C and allowed to be discharged upon a new supply of crystals.

I have spoken of the temperature at C as being at or near the boiling-point. There is thus a certain amount of evaporation carried on there, although this should not reach the point of violent ebullition. Owing to this fact the mother-liquor is constantly maintained at full strength, and the excess of mechanically-adhering water, which, as I have stated, generally accompanies the crystals, is removed. The removal of this excess increases the yield of precipitate. If any precipitation of anhydrous sulfate takes place in compartment C, it should be from time to time raked out.

It will of course be understood that there is no necessity for limiting the number of compartments E to two, and although I have found the form of apparatus described a convenient one additional compartments may be placed near and in similar communication with compartment C. Likewise the means for circulating the mother-liquor may be varied. One such alternative apparatus is shown in the drawings in Figs. 4, 5, and 6, where the circulation is maintained without raising the liquor to the higher level. In this arrangement compartment C contains two sluices $c\ c$, formed at either side and running to near the left-hand extremity. Partition B is formed with a central gate $b'$, as well as two side gates $b\ b$, which communicate with the sluices. Partition D, between the compartments E E, is movable and may be placed at one side or the other, so as to throw gate $b'$ into communication with either one or the other of the compartments E. In compartment C, immediately opposite the gateway $b'$, is a paddle-wheel $G'$, mounted on a shaft just above the level of the liquor and continuously revolving, with its lower paddles immersed therein, so as to force the mother-liquor through the gate $b'$ into one or other of the compartments E, whence after circulating therethrough and melting the crystals which are being introduced there from trough F it returns through one of the sluiceways to the other end of the compartment C and is again heated. A fall-pipe L is used to remove the excess of mother-liquor.

It will be seen that whatever apparatus is used this process possesses a number of advantages on account of its being continuous in its action and to a degree automatic. As contrasted with an intermittent method of treatment there is a saving of fuel, because there is no drawing of fires nor loss of heat in cooling and reheating the apparatus when this is being emptied and recharged. As there are no stoppages in the operation, the output is greater, and there is therefore a corresponding lessening of the cost of labor per ton of finished salt cake. As contrasted with the old-time plan of boiling down directly to a mush, there is no caking of the thick mass on the containing vessel, with the consequent cracking or burning out of the same. The smoke and fire-gases do not come in contact with the liquor or crystals and the product yielded is white and not discolored. Consequently there is a decided saving of both time and coal in the subsequent treatment in the calcining-furnace. The mass in the furnace simply has to be heated until the water is driven off and does not have to be calcined to redness in order to burn off the ahering carbon derived from the smoke. Under the old method the mass had to be stirred for two or three hours at a full red heat in the furnace to burn it white, whereas by my present process it is necessary to heat it for only thirty to forty-five minutes in the furnace to drive off the water. This process also possesses the additional advantage of yielding a pure product. Many of the native soda deposits contain some admixture of the salts of magnesium and also of the salts of sodium other than the sulfate—for example, the chlorid, borate, and one or more of the several carbonates of sodium. The borate and the carbonates have a higher commercial value than the sulfate. The greater portion of all of the above-mentioned salts is separated from the anhydrous sulfate (that falls down) and passes out in the mother-liquid, provided these salts do not occur in too large a percentage and provided that the temperature of the mother-liquor in the precipitating-compartment be maintained sufficiently high to hold them in solution there. The circulatory system of my process is peculiarly adapted to accomplishing this end. As a result the anhydrous sulfate is obtained nearly free from admixed salts, and these salts are obtained in a more concentrated form in the mother-liquor—a condition more favorable to their subsequent recovery than exists when other processes are used.

The entire plant is simple and is peculiarly adapted to handling the crystals *in situ* in the event of the operation being carried out at the deposits where the soda salts occur. It is precisely in such remote regions that a process free from wear and tear and from complicated apparatus is desirable. This is more especially true when, as in this case, the resulting product has a low commercial value.

Having thus described my invention, I claim—

1. The process of extracting anhydrous sulfate of soda from Glauber salt in admixture with other salts, which consists in continuously treating the salts in one compartment with a hot saturated solution of sulfate of soda until they melt and precipitate the anhydrous sulfate; continuously heating the solution up to or near the boiling-point in another compartment; continuously causing the solution to circulate between the two compartments; removing from the apparatus the excess of solution supplied by the melting of the new salts and containing in solution the admixed salts; and removing the precipitated anhydrous sulfate and calcining it, substantially as described.

2. The process of dehydrating Glauber salt, which consists in treating the crystals in one compartment with a hot saturated solution of sulfate of soda until they melt and precipitate the anhydrous sulfate; heating the solution up to or near the boiling-point in another compartment; and causing the solution to circulate continuously between the two compartments, substantially as described.

3. The process of dehydrating Glauber salt, which consists in treating the crystals in one compartment with a hot saturated solution of sulfate of soda until they melt and precipitate the anhydrous sulfate; heating the solution in another compartment to the point of gentle ebullition, whereby the excess of water contained in the native crystals is removed by evaporation; and causing the solution to circulate continuously between the two compartments, substantially as described.

4. The process of dehydrating Glauber salt, which consists in treating the crystals in one compartment with a hot saturated solution of sulfate of soda until they melt and precipitate the anhydrous sulfate; heating the solution up to or near the boiling-point in another compartment; continuously causing the solution to circulate between the two compartments; and removing from the apparatus the excess of solution supplied by the melting of the new crystals, substantially as described.

5. The process of dehydrating Glauber salt, which consists in treating the crystals in one compartment with a hot saturated solution of sulfate of soda until they melt and precipitate the anhydrous sulfate; continuously heating the solution up to or near the boiling-point in another compartment; continuously causing the solution to circulate between the two compartments; removing from the apparatus the excess of solution supplied by the melting of the new crystals; and utilizing this heated excess of solution caused by the melting of the new crystals to partially preheat the supply of crystals about to be introduced into the precipitating vessel, substantially as described.

6. The process of dehydrating Glauber salt, which consists in treating the crystals in one of a plurality of precipitating-compartments with a hot solution of sulfate of soda until they melt and precipitate the anhydrous sulfate; continuously heating the solution up to or near the boiling-point in another compartment; and causing the solution to circulate between the latter compartment and one of the precipitating-compartments in regular succession; and removing the precipitate from those of the precipitating-compartments through which for the time being the circulation is not maintained, substantially as described.

7. The process of dehydrating Glauber salt, which consists in continuously introducing into the compartment containing it a solution of sulfate of soda, at a temperature at or near the boiling-point, and continuously withdrawing the same, whereby a maximum amount of the anhydrous salt is precipitated, substantially as described.

HENRY PEMBERTON, JR.

Witnesses:
JAMES H. BELL,
E. REESE.